Jan. 3, 1950     E. BORTNICK     2,493,613
TRACTOR ATTACHMENT FOR BABY CARRIAGES
Filed March 7, 1947
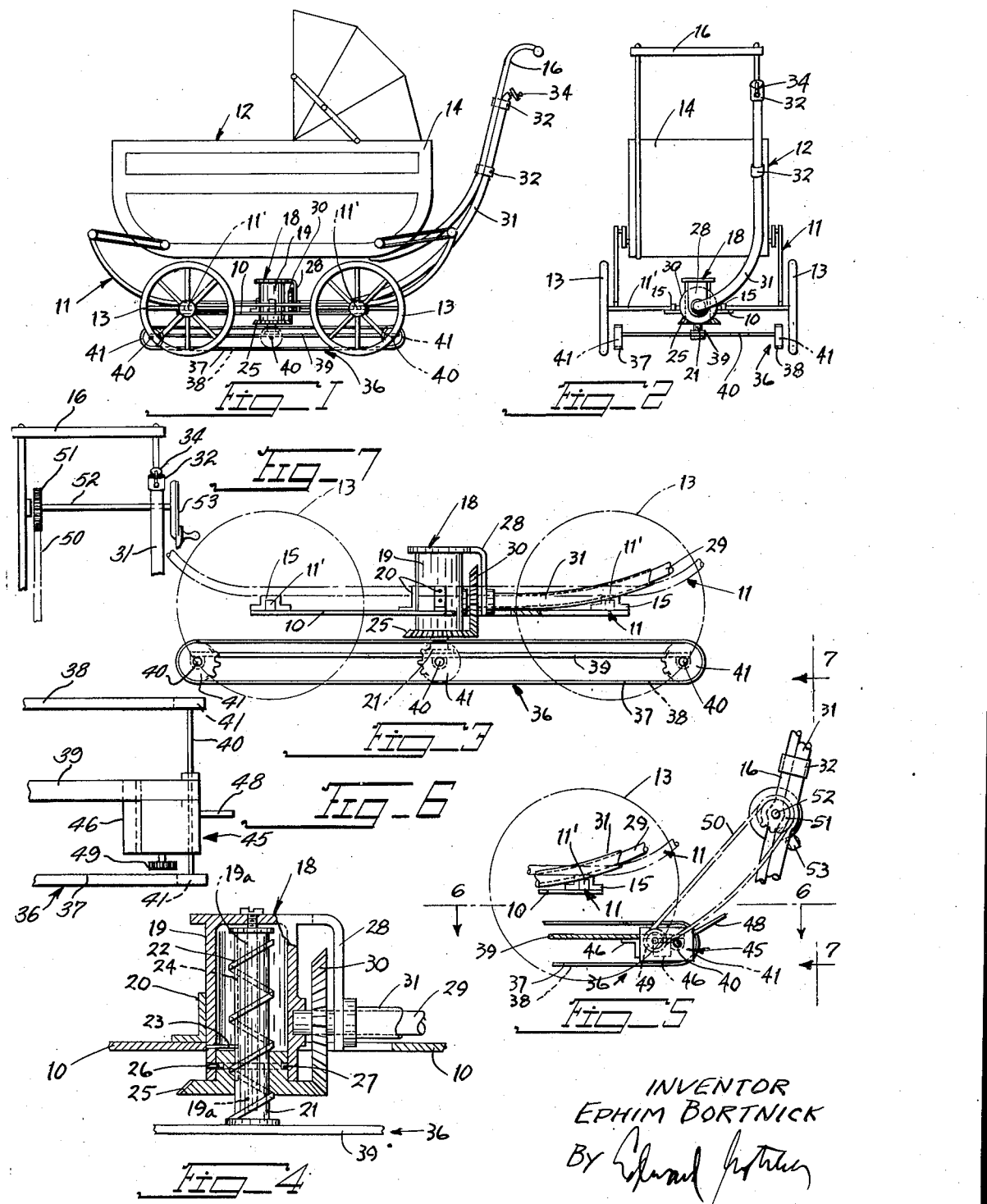
INVENTOR
EPHIM BORTNICK
ATTORNEY.

Patented Jan. 3, 1950

2,493,613

UNITED STATES PATENT OFFICE 2,493,613

TRACTOR ATTACHMENT FOR BABY CARRIAGES

Ephim Bortnick, New York, N. Y.

Application March 7, 1947, Serial No. 733,004

2 Claims. (Cl. 180—9.1)

This invention relates to new and useful improvements in baby carriages.

More particularly, the invention contemplates a tractor attachment for baby carriages which may be attached on old carriages, or which may be applied as original equipment on new carriages. The purpose of the tractor attachment is to make it possible to push the carriage up steps.

Modern apartment houses have baby carriage rooms in their basements in which mothers may store their carriages. However, most tenement houses have no such arrangement and it is customary for mothers to leave their carriages in hallways since it is very difficult to haul a baby carriage up and down steps.

The invention proposes to so arrange the tractor attachment that normally it is in a raised position, allowing the wheels of the carriage to engage the ground. Then the carriage may be pushed along in the usual way. However, when it is desired to negotiate stairs the tractor attachment is manipulated so as to move to a lowered position beneath the bottom of the wheels of the carriage, to lift the carriage slightly, and then the carriage may be maneuvered upon the tractor members of the tractor attachment. It is then an easy matter to negotiate the stairs. Thereafter the tractor attachment is manipulated so as to move to a raised position above the bottom of the wheels of the carriage which may then be pushed along on its wheels in the usual way.

It is proposed to characterize the tractor attachment by the fact that it includes a support for attachment on and beneath the chassis of a baby carriage between its wheels. A jack is associated with the support and has a stationary body mounted centrally on the support, and a vertically operable jack arm extending downwards. A tractor is mounted on said jack arm and has endless tractor members for extending forwards and rearwards of said carriage inside of its wheels, and normally positioned slightly above the bottom of the wheels whereby when said jack is operated and said jack arm moves downwards, said tractor will engage the ground and raise said carriage to a position in which its wheels are a short distance off the ground. Now the carriage may be pushed up stairs on the lowered tractor. Thereafter the jack may be operated to lift the tractor back to its raised position, and then the carriage may again be pushed on its wheels.

Another object of the invention is the construction of a device as described which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Fig. 1 is a side elevational view of a baby carriage provided with a tractor attachment in accordance with this invention.

Fig. 2 is an end view of Fig. 1 looking from the right hand end.

Fig. 3 is an enlarged elevational view of the tractor attachment shown in Fig. 1, but illustrated, per se, with certain parts of the carriage schematically indicated.

Fig. 4 is a fragmentary enlarged sectional view through the jack portion of the tractor attachment as shown in Fig. 3.

Fig. 5 is a fragmentary view similar to a portion of Fig. 3 but disclosing a baby carriage constructed in accordance with a modified form of this invention.

Fig. 6 is a fragmentary horizontal sectional view of the baby carriage shown in Fig. 5, this view being as though taken on the line 6—6 of Fig. 5.

Fig. 7 is a fragmentary end view of the baby carriage shown in Fig. 5, this view being taken as though looking in the direction of the line 7—7 of Fig. 5.

The tractor attachment for baby carriages, in accordance with this invention, includes a support 10 for attachment on and beneath the chassis 11 of a baby carriage 12 and between the wheels 13 thereof. The baby carriage 12 may be of any design and construction. It is shown to include a carriage body 14 mounted upon said carriage chassis 11. This chassis 11 includes axles 11' for the wheels 13. The support 10 is in the nature of a strip which is mounted beneath and attached to the axles 11' with brackets 15. A handle 16 is attached to the body 14 by which the carriage may be conveniently pushed along in the usual way.

A jack 18 having a stationary body 19 mounted centrally on the support 10 with several brackets 20 is provided with a vertically operable jack arm 21 extending downwards. The jack 18 may be of any design and construction provided it is possible to cause the jack arm 21 to move upwards and downwards. The particular design shown includes screw threads 22 formed upon the jack arm 21 which is vertically slidably, but non-rotatively mounted. A pin 23 from the body 19 engages a longitudinal slot 24 formed in the jack arm 21 for holding it non-rotative and slidable. The screw 22 threadedly engages through a bevel gear 25 which is rotatively supported in the bottom of the body 19 by a pin 26 engaging a circumferential slot 27 formed on the hub portion of the bevel gear 25. A guide rod 19a is fixedly mounted on the jack body 19 and extends centrally through the jack arm 21 for steadying the jack arm 21 in its vertical movements.

The jack body 19 is provided with a bracket 28 rotatively supporting a flexible shaft 29 which is connected with a bevel gear 30 meshing with the bevel gear 25. The flexible shaft 29 is housed in a flexible casing 31 which extends rearwards and upwards along one side of the carriage handle 16. The flexible casing 31 is held in position by several clamps 32 connected with the carriage handle 16. The outer end of the flexible shaft 29 is provided with a handle 34 by which the shaft 29 may be turned. By turning the handle 34 in one direction or the other it is possible to drive the gears 30 and 25 and cause the jack arm 21 to move downwards or upwards.

A tractor 36 is mounted on the bottom of said jack arm 21 and is provided with endless tractor members 37 and 38 extending forwards and rearwards of the carriage 12 inside of its wheels 13 and normally positioned slightly above the bottom of the wheels 13, whereby when the jack 18 is operated said jack arm 21 will move downwards and move the tractor 36 downwards to engage the ground and raise the carriage 12 to a position in which its wheels 13 are a short distance off the ground.

The tractor 36 includes a frame 39 attached to the jack arm 21 and extending forwards and rearwards and supporting a number of transverse shafts 40. These shafts 40 are provided with sprocket wheels 41 over which the endless tractor members 37 and 38 engage. The endless tractor members 37 and 38 may be of rubber, other friction materials, and materials from which tractor members are generally made.

The operation of the tractor attachment for baby carriages may be understood from the following:

Normally, the tractor 36 is in the raised position as illustrated in the drawing. When in this position the baby carriage 12 may be pushed along in the usual way and it will ride on its wheels 13. When it becomes necessary to ascend or descend stairs it is merely necessary to rotate the handle 34 in one direction so as to rotate the flexible shaft 29, which in turn drives the bevel gears 30 and 25. Rotations of the bevel gear 25 will cause the screw 22 to descend, moving the jack arm 21 downwards. Since the tractor 36 is mounted upon the jack arm 21 it will also move downwards. The tractor 36 is moved down until its bottom is about two inches below the bottom of the wheels 13. Now it is a simple matter to push the baby carriage up or down stairs on the operative tractor 36.

The handle 34 may be rotated in the other direction to indirectly cause the jack arm 21 to move upwards. In this way the tractor 36 is moved upwards to its original raised position above the bottom points of the wheels 13. Now the carriage may again be pushed along on its wheels 13.

In Fig. 5 a modified form of the invention has been disclosed which distinguishes from the prior form in the fact that a spring motor has been associated with the tractor 36 for driving the same. The spring motor 45 is mounted on the frame 39 by several brackets 46. The spring motor drives one of the transverse shafts 40 for driving the sprocket wheels 41 and thus driving the tractor members 37 and 38. The spring motor 45 is provided with a handle operated brake 48 by which it may be stopped, or released, so that it may operate. The spring motor 45 is provided with a winding sprocket wheel 49. This sprocket wheel 49 is engaged by a sprocket chain 50 extending upwards and connected with a sprocket wheel 51 mounted upon a shaft 52 rotatively engaging through the carriage handle 16. The shaft 52 is provided with a handle 53 by which the spring motor 45 may be wound.

In other respects this form of the invention is identical to the previous form and similar parts are indicated by similar reference numerals.

The operation of this form of the invention may be understood from the following:

The handle 53 is rotated for winding the spring motor 45. When it is desired to drive the carriage up flights of stairs, the tractor 36 is lowered into its operative position. Then the spring motor 45 is controlled by releasing or engaging the handle operated brake 48.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. In combination with a baby carriage having a chassis provided with a pair of front wheels and a pair of back wheels, a support attached to said chassis at a location between said wheels, a jack having a stationary body mounted on said support centrally of said baby carriage and having a vertically operable jack arm extending downwards, a frame attached to said jack arm and extending longitudinally to points forward and rearward of the axes of said front and back wheels respectively, transverse shafts mounted on the front and rear ends of said frame and extending to points adjacent the inner faces of said wheels, sprocket wheels mounted on the ends of said shafts, and endless tractor members extending longitudinally and engaged over said sprocket wheels in order that said carriage is bodily lifted vertically a short distance off the ground upon downward projection of said jack arm and is supported in a stable elevated position.

2. In combination with a baby carriage having a chassis provided with a pair of front wheels and a pair of back wheels, a support attached to said chassis at a location between said wheels, a jack having a stationary body mounted on said support centrally of said baby carriage and having a vertically operable jack arm extending downwards, a frame attached to said jack arm and extending longitudinally to points forward and rearward of the axes of said front and back wheels respectively, transverse shafts mounted on the front and rear ends of said frame and extending to points adjacent the inner faces of said wheels, sprocket wheels mounted on the ends of said shafts, endless tractor members extending longitudinally and engaged over said sprocket wheels in order that said carriage is bodily lifted vertically a short distance off the ground upon downward projection of said jack arm and is supported in a stable elevated position; and a motor connected with one of said shafts for driving said endless tractor members for assisting said carriage in being pushed upstairs on said endless tractor members.

EPHIM BORTNICK.

(References on following page)

REFERENCES CITED

The following references are of record in the file of this patent:

UNITED STATES PATENTS

| Number | Name | Date |
|---|---|---|
| 1,376,648 | Schneider | May 3, 1921 |
| 1,866,714 | King | July 12, 1932 |
| 2,072,222 | Schuttkus | Mar. 2, 1937 |

FOREIGN PATENTS

| Number | Country | Date |
|---|---|---|
| 610,344 | Germany | Mar. 8, 1935 |